United States Patent [19]

Trubisky et al.

[11] Patent Number: 4,521,851
[45] Date of Patent: Jun. 4, 1985

[54] CENTRAL PROCESSOR

[75] Inventors: Leonard G. Trubisky, Scottsdale; William A. Shelly, Phoenix, both of Ariz.

[73] Assignee: Honeywell Information Systems Inc., Phoenix, Ariz.

[21] Appl. No.: 434,122

[22] Filed: Oct. 13, 1982

[51] Int. Cl.³ ............................ G06F 9/28; G06F 9/38
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,112,489 | 9/1978 | Wood | 364/200 |
| 4,156,906 | 5/1979 | Ryan | 364/200 |
| 4,295,193 | 10/1981 | Pomerene | 364/200 |

Primary Examiner—James D. Thomas
Assistant Examiner—Thomas Lee
Attorney, Agent, or Firm—Edward W. Hughes; Arthur A. Sapelli; L. J. Marhoefer

[57] ABSTRACT

A central processor for a general-purpose digital data processing system. The processor has a pair of caches, an operand cache for operands and an instruction cache for instructions, as well as a plurality of execution units, where each execution unit executes a different set of instructions of the instruction repertoire of the central processor. An instruction fetch unit fetches instructions from the instruction cache and stores them in an instruction stack. The central pipeline unit which has five stages obtains instructions of a given program in program order from the instruction stack of the instruction fetch unit. In the first stage of the central pipeline unit, the instruction is decoded; in the second, the address preparation of an operand whose address is included in the instruction is initiated; in the third cycle, the address preparation is completed and the operand cache is accessed; in the fourth cycle, the operand is selected from the operand cache; and, in the fifth cycle, the instruction and operand are transmitted to the one of the plurality of execution units capable of executing the instruction. The results of the execution of each instruction by each execution unit are stored in a results stack associated therewith. A collector unit causes the results of the execution of the instructions of the program in execution to be stored in a master safe store register in program order, which is determined by the order of issuance of the instructions by the central pipeline unit. The collector also issues write commands to store results of the execution of instructions into the operand cache.

6 Claims, 2 Drawing Figures

CENTRAL PROCESSOR

CROSS-REFERENCE TO RELATED CO-PENDING APPLICATIONS

The following copending applications relate to the present application and are incorporated herein by reference.

A. "Method and Apparatus for Prefetching Instructions" invented by Russel W. Guenthner, William A. Shelly, Gary R. Presley-Nelson, and Kala J. Marietta;

B. "Method and Apparatus for Initiating the Execution of Instructions" invented by John E. Wilhite, William A. Shelly, Russell W. Guenthner, Leonard G. Trubisky, and Joseph C. Circello;

C. "Collector" invented by Russell W. Guenthner, Gregory C. Edgington, Leonard G. Trubisky, and Joseph C. Circello; and D. "Distributor" invented by John E. Wilhite and William A. Shelly.

All of the foregoing are assigned to the same assignee.

BACKGROUND OF THE INVENTION

1. Field of the Invention

This invention is in the field of general-purpose digital data processing systems having a central processor which is optimized to achieve maximum throughput. The central processor includes a plurality of execution units, each of which executes a different subset of the instructions constituting the repertoire of the processor. The execution units are independent of each other and act in parallel, or the execution of the instructions of a given program is overlapped. An instruction fetch unit fetches instructions from a cache unit and stores the instructions in an instruction stack. The central pipeline unit fetches the instructions of a program in program order from the instruction stack and in a series of sequential steps identifies the instruction, forms the address of the operand from the address portion of the instruction, and obtains the operand from the operand cache portion of the cache unit. The operand and execution command is then distributed to one of the execution units for processing. A collector is provided in which the results of the execution of instructions of a given program by the execution units are received and stored in program order together with a master copy of the program-addressable registers of the processor. Store instructions are executed by the collector which writes operands or data words into the operand cache. Data so modified is retained in the cache until need for that data is established outside of the central processor, at which time the data is written into the RAM memory of the system.

2. Description of the Prior Art

Typically, in large-scale, general-purpose digital data processing systems, the central processor of such a system includes circuits for producing the addresses of instruction words of a given program in the memory of the system, for fetching the instructions from memory, for preparing the addresses of operands, for fetching the operands from memory, for loading data into designated registers, for executing the instructions, and, when the results are produced, for writing the results into memory or into program-visible registers.

To increase the performance of the processors and of the systems as a whole, i.e., throughput, of data processing systems, various modifications have been incorporated into the central processing units. To reduce the time required to obtain operands and instructions, high-speed caches located in the processor have been provided. To speed up the systems, the systems are synchronized, i.e., a clock produces clock pulses which control each step of the operation of the central processing unit. In pipelined processors, the steps of preparing and fetching the instructions and operands of a program are overlapped to increase performance.

However, there is always a need for more or greater throughput and preferably without changing the instruction repertoire or the internal decor of the processors of such systems so that such high-performance processors are capable of executing existing programs without the necessity for such programs to be modified or changed, or such processors are compatible with the programs written for earlier systems.

SUMMARY OF THE INVENTION

The present invention provides a high throughput synchronous central processor for a large-scale, general-purpose digital data processing system. The processor is provided with a cache unit which has an operand portion, or operand cache, in which primarily operands are stored, and an instruction portion, or instruction cache, in which primarily instructions are stored. The processor has a given repertoire of instructions and a plurality of execution units. Each of the execution units has the capability of executing a different set of instructions of the instruction repertoire. An instruction fetch circuit fetches instructions of a given program primarily from the instruction cache and stores them in an instruction stack. The central pipeline unit, a five-level, or stage, pipeline obtains instructions from the instruction stack in program order. In the first stage or first step of the central pipeline, the instruction is identified and the initiation of the preparation of an address of an operand using the address information portion of the instruction is started; in the second stage, the address of the operand is completed; in the third stage, the address is converted from a virtual memory address space representation to the actual physical address space representation, and a set of candidate operands is accessed from the operand cache along with the physical page number identifying the system memory location from which each of the operand candidates was accessed; in the fourth stage, the operand page number portion of the physical address is compared with the page number associated with each of cache accessed operand candidates and assuming thee is a match; in the fifth step, the selected operand and execution command code are transmitted to the execution unit uniquely capable of performing the instruction. At the same time, the instruction code is transmitted to the collector. As the instructions of a given program are sent to the execution units, they are executed or are held in an input stack awaiting their turn to be executed in that unit. The instructions are executed in the order received by each execution unit. Each of the execution units performs its operations independently and in parallel with one another. Therefore, instructions of a given program sent to different execution units may not be completed in the same time sequence as originally fetched from cache. Each of the instruction units is provided with a results stack into which is placed the results of the execution of the instructions by that unit. The collector fetches these results from the appropriate execution unit in program order, the order in which the instructions of a given program are to be executed, and places them in the collector's master safe store or its store stack. The master safe store maintains a valid copy of all of the program-visible registers of the cental processor unit. The data to be written into memory is placed in the store stack prior to being written into the operand cache where it remains for use or further modification until displaced or needed by other units of the system of which the processor is a part. The modified data upon displacement or system demand is then written into the random-access memory of the system of which the CPU is a portion.

It is, therefore, an object of this invention to provide a central processor unit which allows for increased throughput of data.

It is another object of this invention to provide a central processor unit in which the execution of instructions of a given program is overlapped to improve throughput.

It is still another object of this invention to provide a central processor unit with an instruction cache and an operand cache.

BRIEF DESCRIPTION OF THE DRAWINGS

Other objects, features and advantages of the invention will be readily apparent from the following description of a preferred embodiment thereof taken into conjunction with the accompanying drawings, although variations and modifications may be effected without departing from the spirit and scope of the novel concepts of the disclosure.

DESCRIPTION OF THE PREFERRED EMBODIMENT

Figure 1:
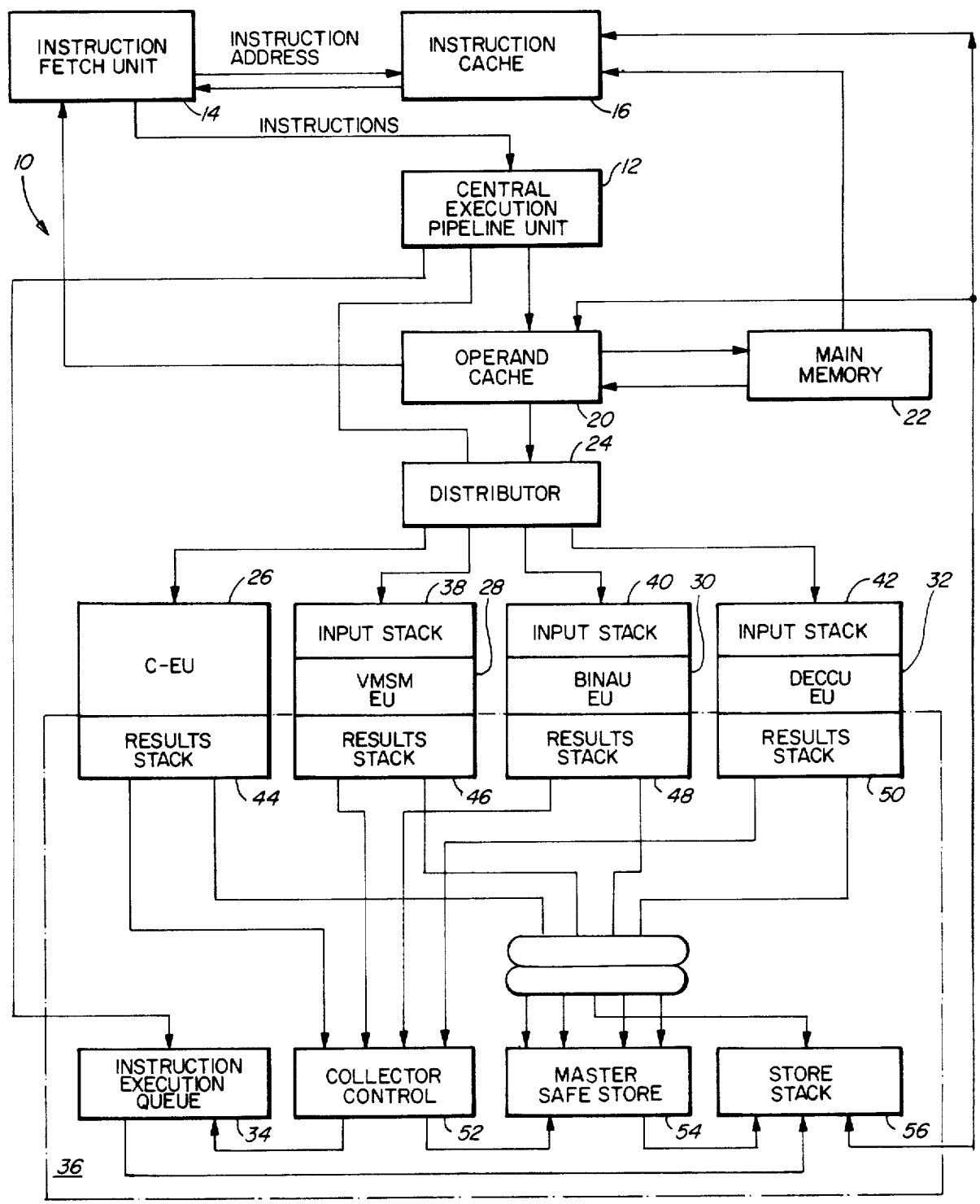
FIG. 1 is a block diagram of the central processing unit of this invention.
Figure 2:
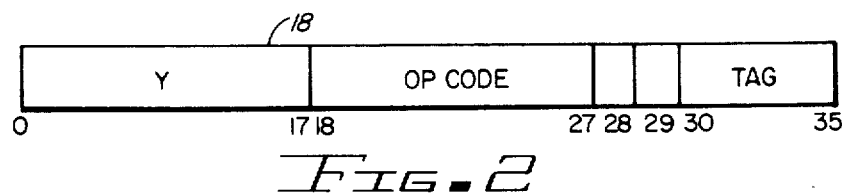
FIG. 2 is the format of an instruction word.

In FIG. 1, the major components, or subsystems, of central processor 10 of a large-scale general-purpose digital computer are illustrated. The central pipeline unit, or structure, 12 controls the overall operation of processor 10. The instruction fetch unit 14 supplies, or transmits, the address of instruction words to instruction cache 16. In response to the receipt of an instruction address by instruction cache 16 from instruction fetch unit 14, an instruction double word is transmitted from cache 16 to instruction fetch unit 14 which stores, or accumulates, a series of instructions of a given program in an instruction stack which is a part of the instruction fetch unit 14. The central pipeline unit 12 obtains the instructions in program order from the instruction stack of instruction fetch unit (IFU) 14, preferably one per clock period, or clock pulse, of the system clock of processor 10. The central pipeline unit structure 12 is a 5-stage pipeline in which in the first stage the operation code, bits 18-27 of instruction word 18 illustrated in FIG. 2, is decoded and formation of the operand's address is started using the 18 bits denoted Y in FIG. 2, bit positions 0 through 17, bit 29 and the 6 bits denoted as TAG in FIG. 2. In the second stage, the address formation is completed. In the third and fourth stages, the directory of operand cache 20 is searched to determine if the operand is located in the operand cache 20, and the operand is accessed or obtained from the cache data storage. However, if the operand is not stored in the cache, then a block of eight words which contains the operand is fetched from main memory 22 and stored in the operand cache after sending the desired operand to the distributor. In the fifth stage, distributor 24 distributes, or dispatches, each instruction and its operand to the appropriate execution units, such as the central execution unit CEU 26, the virtual memory and security manager VMSM 28, the binary arithmetic execution unit BINAU 30, or the decimal character unit DECCU 32. In addition, the instructions and other relevant information, as will be described hereafter, are transmitted in program order to the instruction execution queue 34 of collector 36.

Each of the execution units 26, 28, 30, 32, is capable of receiving instructions and operands of the program in execution and of processing them independently of the other execution units. Each of the execution units 26, 28, 30, 32 includes logic circuits which are optimized for performing the set of instructions assigned to it. In the preferred embodiment, central execution unit 26 performs basic computer operations, such as simple loads, adds, subtracts, etc., and certain miscellaneous instructions. The central execution unit 24 is unique among the four execution units 26 through 32 in that it executes each instruction as received, usually within one clock period. As a result, the central execution unit 26 is not provided with an input stack as are the other execution units illustrated in FIG. 1. The virtual memory and security manager unit 28 executes instructions relating to virtual memory, security and special instructions that are peculiar to a secure operating system. The BINAU execution unit 30 executes binary arithmetic instructions, such as multiply, divide and floating point instructions. The decimal/character execution unit 32 executes alphanumeric, decimal arithmetic, and bit string instructions. Execution unit 28 is provided with, or has associated with it, an input stack 38; execution unit 30 has provided with it an input stack 40; and execution unit 32 has two input stacks 42 associated with it. The function of input stacks 38, 40 and 42, is to store the operation code and operands of the instructions awaiting execution by each input stack's associated execution unit.

Each of the input stacks 38, 40, 42, is a conventional first-in, first-out stack having 16 levels, with each level adapted to store a double data word. In the preferred embodiment, each word has 36 bits so that a double word has 72 bits. In addition, an execution code derived from the operation code of the instruction word to be performed or executed is stored with the operand in the input stack. The input stacks 38 through 42 of execution units 28 through 34 are fifo, or first-in, first-out stacks, so that the first operation code and operand required for each operation code applied to a given execution unit is the first one read out of the input stack for execution by that unit. Each of the execution units is also provided with a results stack. Results stack 44 is associated with the central execution unit 26, results stack 46 is associated with VMSM execution unit 28, results stack 48 is associated with the binary execution unit 30, and results stack 50 is associated with the DECCU execution unit 32. In the preferred embodiment, the results stacks are conventional first-in, first-out stacks, each of which has 16 levels. The results of the operation of an instruction are stored in the stacks in the order in which they are executed. Each level of a results stack has the capability of storing a double word, as well as additional information with respect to the double word. The operational code of each instruction word in execution, along with other information, is a part of an instruction execution queue word (IEQ) which is stored in the execution queue 34 which, in the preferred embodiment, is a conventional first-in, first-out stack of 16 levels.

An important feature of the processor unit 10, from the standpoint of performance, is that both the operand cache 20 and the instruction cache 16, which together form a cache unit, and the main memory 22 perceive the addressed space as being composed of blocks of eight 36-bit words. All data transfers between the main memory and the caches 20 and 16 are in units of eight such words or blocks. Movement of data within the processor unit 10, particularly between the cache units and the execution units, is on a double word, or pair, basis and only the double word required is so moved. The distributor 25 supplies operands from the cache 20 to the various execution units and maintains multiple copies of the AQ register, one set for the central pipeline unit structure, the BINAU and the DECCU. The instruction fetch unit 14 consists of an instruction prefetch pipeline of five stages. Instruction prefetch unit 14 stores prefetched instructions and data in its instruction stack. The instructions represent the current instruction stream and one or more prefetched alternate streams or indirect words predicted by the transfer/indirect prediction table of unit 14. The instruction fetch unit supplies instructions to the central pipeline unit 12. In central pipeline unit 12, instructions are decoded during the I, or instruction, cycle of central pipeline unit 12. Instruction prefetch pipeline 14 does not examine the instruction operation codes of instructions prefetched by it, but rather uses the instruction count of its instruction counter register to search the transfer and indirect prediction table to determine if a given instruction is a branch to a new memory location or is an instruction requiring indirect addressing.

The instruction prefetch pipeline provides the instruction execution pipeline 12 with a supply of instructions to be executed. This is accomplished by use of a transfer and indirect prediction table to predict new instruction sequences and then to prefetch the instructions of the new instruction stream, two words at a time, from the instruction cache or occasionally from the operand cache and placing such instructions or indirect words in the instruction stack. Loading such new instruction sequences into the prefetch instruction stack occurs only if the transfer/indirect prediction table indicates that one such instruction of each pair was a successful transfer, or required an indirect cycle the previous time the instruction was executed. When this occurs, instruction prefetch pipeline 14 diverts the current instruction sequence to fetch the target word of the transfer instruction or indirect instruction. Otherwise, the instruction prefetch pipeline continues sequentially fetching instructions and placing them in its instruction stack. The instruction prefetch pipeline of instruction fetch unit 14 also returns to sequential prefetching if the predicted transfer instruction turns out to be a nontransfer when the instruction in question is actually executed. The prefetched transfer or indirect targets are available for processing by the central unit pipeline structure 12 as soon as they are fetched and stored in the instruction stack of the instruction fetch unit 14. Thus, it is not necessary to wait for the actual execution of a transfer or indirect instruction by the central pipeline structure unit to be completed before IFU 14 starts placing instructions of the new instruction stream in the instruction stack of IFU 14. In this way, the effective execution time of transfer instructions and instructions with indirect operands is minimized.

The instruction prefetch operates in five cycles in a manner similar to the five cycles of the central pipeline unit 12. One difference is that IFU 14 disposes of instructions by placing them in its instruction stack a double-word pair at a time whereas CUPS 12 disposes of instructions one word at a time by forwarding them to central execution unit 26 or to the input stacks of the execution units 28, 30, 32. Another difference is that IFU 14 checks with its transfer/indirect prediction table to determine if a transfer or indirect address is to be executed, whereas the central pipeline unit structure updates the transfer/indirect prediction table of IFU 14. During the first cycle or stage of the instruction prefetch pipeline of IFU 14, the instruction counter of CPU 10 is incremented by two. During the second cycle, the address of an instruction pair is distributed to the transfer/indirect prediction table and the instruction operand caches. During the third cycle, the transfer/indirect prediction table and instruction cache 16 are accessed. The instruction cache access consists of a set of double words, four in the preferred embodiment, plus a physical page address denoting the physical system memory location associated with these double words. During the fourth cycle, the physical page address of the desired instruction pair is compared with the page address of each of the cache-accessed double words. If a match occurs, the double word associated with the match is selected as the instruction double word. If no match occurs, the operand cache is searched for the instruction double word. If the instruction double word is found neither in the I cache nor the O cache, an 8-word block containing the desired instruction double word is fetched from the main memory 10 and placed in the instruction cache.

The transfer/indirect prediction table is accessed in order to see if either or both of the instructions being accessed is predicted to be a transfer/go instruction during the compare/select or fourth cycle. The instruction pair is selected from one of the four cache levels corresponding to a match of the real page number from the directory of the current instruction stream. The instruction pair read out of the cache is saved in an instruction fetch register, the real page number is saved, and the response from the transfer/indirect prediction table is checked to see if either of the instructions is recorded in the transfer/indirect prediction table as a transfer/go. Note that the response from the transfer/indirect prediction table arrives two cycles after it is interrogated. During the execution cycle, the fifth cycle of the prefetch instruction pipeline, the instruction pair is placed in the instruction stack so that, if the transfer/indirect prediction table indicates that either of the instructions is a transfer, the instruction prefetch pipeline will prepare to fetch instructions from the new instruction stream. The timing is such that up to two extra double-word pairs from the current instruction stream will also be read from the cache. In the event the predicted transfer/go turns out to be a no go, the extra double-word pairs are still available in the instruction stack. Pointers associated with the instruction stack enable central instruction prefetch unit 12 to read instructions out of the instruction stack in the correct sequence, or in program order.

The instruction stack functions as an instruction queue between instruction prefetch unit 14 and the instruction execution unit or central unit pipeline structure 12. In the preferred embodiment, the instruction stack is 15-levels deep. Once instructions or indirect words are placed in the instruction stack by the instruction fetch unit pipeline structure, they remain until they are executed or until it is determined that they are not to be executed. In the case of a transfer instruction or instructions requiring an indirect word for which a history is found in the transfer/indirect prediction table during prefetch, the instruction stack control contains a pointer to the instruction stack location holding the address of the target instruction, or of the indirect word. The instruction stack is a cyclic round-robbin stack. There is a sixteenth entry which is used to buffer instruction double-word pairs. Instructions and indirect words or operands flow from the instruction stack of IFU 14 to the central pipeline unit structure 12 through the base instruction register of central unit 12 a single word at a time.

Central pipeline unit 12 also has five stages or cycles. In the first, the operation code of the instruction is decoded and formation of the operand address is started; in the second, the operand address is completed; in the third, the address is converted from a virtual memory address space representation to the actual physical address space representation, and a set of candidate operands is accessed from the operand cache along with the physical page number identifying the system memory location from which each of the operand candidates was accessed; in the fourth, the operand page number portion of the physical address is compared with the page number associated with each of cache accessed operand candidates and assuming there is a match; in the fifth, the selected operand and execution command code is transmitted to the execution unit uniquely capable of performing the instruction. It should be mentioned that some of the activities carried out are skewed across the pipeline stages as defined. It is the central pipeline unit structure 12 that makes entries into the transfer/indirect prediction table of IFU 14. Whenever the central pipeline unit structure executes a transfer-go instruction, the central pipeline unit structure 12 verifies any corresponding entry which may be in the transfer/indirect prediction table. If a predicted transfer turns out to be a no-go or nontransfer, then that entry in the TIP table is deleted. In the case of an impure procedure, for example, the target address of the transfer instruction has been modified, but the operational code still remains a transfer; the appropriate entry in the transfer/indirect prediction table is corrected to reflect this fact. In the event of a transfer-go not previously recorded, a new entry is made in the TIP table which may displace another entry should all four levels corresponding to the instruction counter for that particular instruction be occupied. The displacement algorithm is random since there is little benefit in adding the necessary complex circuitry to displace the least recently used entry because of the infrequency of transfer/indirect prediction table misses. The central unit interacts with the transfer/indirect prediction table in other ways. In the case of impure procedure where the operation code is changed but the transfer/indirect prediction table still predicts a transfer, the central pipeline unit structure 12 will detect the fact in the instruction cycle where the instruction is first decoded. In the case of indirect instructions, the central pipeline unit structure 12 also makes an entry into the transfer/indirect prediction table for these. The instruction execution pipeline 12 has the critical role in central processor 10 in achieving the necessary high levels of performance as any interruptions due to data not being in the cache unit, unexpected transfers, etc., will halt the operation of the central pipeline unit until such occurrences are remedied.

The transfer/indirect prediction table consists of 4,906 entries which are divided into 1,024 sets of four entries each. The TIP table serves to record the target address for the first level of indirection and also to predict the target address for both conditional and unconditional transfers. During the first execution of a successful; i.e., transfer-go instruction or an instruction requiring an indirect word, there will be a break in the pipeline of the central pipeline structure, while the target address is formed and the target acessed from the cache. On the first execution, information is prepared for the transfer/indirect prediction table defining the location of the target instruction in the cache unit. During the next prefetch of the transfer instruction or instruction requiring an indirect word, the prefetch pipeline accesses the transfer/indirect prediction table and determines the target location in order to also prefetch the alternate instruction stream or indirect word. Checking the transfer or indirect instruction occupies only one clock period of the central pipeline unit in order to verify that the prefetch target address has not changed. During subsequent executions of any transfer instruction, the transfer/indirect prediction table entry is updated only if the transfer does not go as expected. The transfer/indirect prediction table keeps track of only one level of indirection. The cache addresses of indirect words are put in the TIP table only if the indirect words are not modified.

The cache unit consists of two separate 8K caches, instruction cache 16, and operand cache 20. Data is maintained in each cache on an eight-word block basis. A block consists of eight consecutive 36-bit main memory words, the first word of which has an address of 000 in binary notation. A reference to any word in a block causes the entire block to be read from main memory, unless the block is already in the appropriate cache. Any block in a cache is retained until it is displaced by another block or until it is cleared from the cache by a cache clearing instruction. The instruction cache 16 holds blocks of unmodified instructions and indirect words, while the operand cache holds blocks of operands, modified instructions and indirect words. Operand data cannot be fetched from the instruction cache nor can data be modified in the instruction cache. It is, however, possible to fetch instructions from the operand cache, but the normal and desired mode of operation is to fetch instructions from the instruction cache only. If a block which is contained in the instruction cache is referenced for a store or data fetch operation, that block is cleared from the instruction cache and refetched from main memory 22 and placed in the operand cache 20. In summary, operands are fetched only from the operand cache and they may be stored only into the operand cache. Instructions may be fetched from either cache, but there is a performance preference for the instruction cache.

Each cache has a four-level set associate directory for the accompanying storage for 8K 36-bit words. Each cache is organized as 256 rows of four 8-word blocks. The first eight words of physical memory map onto the first row of the cache, row 0. Words 8 through 15 on the second row, row 1, etc., with words 2,040 to 2,047 mapping onto the last row, row 255. Each successive 2K of physical memory maps onto the cache in a similar manner. Hence, the cache row number of an eight-word block is known from its physical memory address. Since each row has space for four 8-word blocks, in four levels, the levels for a particular row in a given cache unit will be filled before there is a contention for space in that row. After all levels in the row have been filled, older blocks in the row are displaced on a least recently used basis. Thus, five hits to the same row are required before an incoming block of eight words can displace a prior block of eight. If an eight-word block of instructions is in the operand cache, instruction prefetch unit 14 can fetch the instructions from the operand cache a double-word pair at a time, but without removing them from the operand cache. Usually, the instruction prefetch unit runs far ahead of the instruction execution pipeline of the central pipeline unit structure 12, so this penalty is not always visible, but such a situation can cause an instruction prefetch pipeline to fall behind, in which case the lack of the proper instruction will result in a break in the pipeline of the central pipeline unit structure. Performance is enhanced by a store into cache as distinguished from a store through cache. All store operations go to the operand cache, but do not immediately go to main memory 22, although displacing the block in which the store occurred will force the writing of that block to main memory. If the block being stored into is already in the operand cache and control information indicates that the eight-word block has already been modified, then the store is completed to the operand cache and no further action is taken. However, if the block is found in the operand cache, but has not yet been modified, central processor unit 10 notifies the central interface unit associated with that block that the block is being modified. The CIU then issues a write notification to any other central processor units which may be present. These must then invalidate any copies of the eight-word block which they might have either in their operand cache or conceivably in their instruction cache. When a data block is not found in the operand cache on a store operation, the block is fetched from memory. Processor 10 indicates to the central interface unit that the fetch is for the purpose of modifying the block so that, when the processor receives the block, the block can be modified without any further communication between units. Only read cache misses cause the pipeline of the central pipeline unit structure to wait for data. On store cache misses, the pipeline continues without waiting for data.

Each cache has a duplicate directory, so that, when a system request is received to either clear a block or to transmit a block to system memory, the processor can search its duplicate cache directory to determine if the block is present without interfering with the operation of the central pipeline unit 12. If the requested block is found, then the processor takes the appropriate action. Otherwise, the duplicate directory responds to the request and the processor is not delayed.

The central unit pipeline structure 12 forwards the operation code of each instruction of a given program as it is received, in program order, to the instruction execution queue 34 for storage therein. Up to sixteen instruction execution queue IEQ words can be stored in queue 34. Collector control 52 uses the operation code of each IEQ word to control the reading out of the results located or stored in the results stacks 44 through 50 of each of the execution units 44, 46, 48, 50, so that the results in proper program order can be stored in either the master safe store MSS 54 or into store stack 56. Results that are stored in store stack 56 are for writes of operands to memory. Instructions which change program addressable registers of central processor 10 generate results that are stored in the master safe store 54 so that at such time as an interrupt, a fault, or a hardware error occurs, the contents of the program addressable registers of the central processor unit 10 are available in master safe store 54. The availability of current and valid contents of all program addressable registers greatly facilitates fault recovery, handling of interrupts, and retrying of instructions as appropriate. The main memory 22 of the data processing system of which the central processing unit 10 is a subsystem provides instructions for the instruction cache 16 and operands for operand cache 20. All stores or writes to main memory 22 are from data stored in the operand cache 20. Thus, whenever data is to be written into memory as a result of an execution of an instruction, the necessary data, operands, are stored in store stack 50 in program order and are issued or written into the operand cache 20 in program order. As a block of operand cache 20 is released so that new data can be written into that block, the operand cache control will have data in that block of cache written into main memory 22 before new data is written into that block.

The central pipeline unit 12 controls the overall operation of processor 10 and has the function of sending operation codes or commands and associated operands to the various execution units 26, 28, 30, 32, where the actual execution of each operation code is performed. Instruction fetch unit 14, under the control of the central pipeline unit 12, fetches instructions primarily from the instruction cache 16 and loads up to sixteen pairs of instructions in an instruction stack which is a part of unit 14. The central pipeline unit structure 12 obtains the instructions from the instruction stack of the instruction prefetch unit. The central pipeline unit 12 prepares the addresses of the operands in a series or sequence of five steps from the operand cache and sends the operation code and the operands to whichever one of the execution units 26, 28, 30 or 32, which has the capability of executing the same. Within the central pipeline unit structure 12 is performed the instruction preprocessing, instruction decode, operand address formation, including paging and search of an associative memory of the operand cache.

The execution units 26, 28, 30, 32, receive commands from the central pipeline unit 12 and operands from the operand cache 20 which are distributed by distributor 24 to the various execution units. The execution of an instruction generally involves the formation of some result based upon current register contents and the input operand which produces a change to a program visible register or to memory.

Processor 10 is provided with four major execution units, each of which is made up of one or more subunits. These units are the central execution unit 26, the binary arithmetic unit which performs floating point and multiply and divide instructions BINAU 30, the decimal character unit DECCU 32, and the virtual memory and security manager unit VMSM 26. Each of the execution units 26 through 32 receives instructions and operands, and then processes them independently of what any of the other execution units may be doing. Execution units 28 and 30 each have an input stack 38 and 40, a sixteen-level fifo stack with each level of the stack capable of holding one double word. Execution unit 32 has two sixteen-level fifo stacks, each capable of holding one double word. A double word in the preferred embodiment comprises 72 bits plus parity bits.

In addition, each execution unit has an associated command stack. Execution units 28 and 30 can hold up to 16 commands awaiting execution while execution unit 32 can hold up to 4 commands awaiting execution. It should be noted that the decision as to which execution unit received or is assigned a given instruction and its associated operand is determined by the central pipeline unit 12 by examining the operational code of each instruction. The particular method used in the preferred embodiment is a conventional table lookup technique. Input stacks 38, 40, 42, allow the central pipeline unit structure 12 to issue operands and associated operation codes of a given program to the execution units at a maximum rate of one per clock period, without waiting for the completion of the execution of preceding multiple execution cycle instructions; i.e., instructions that require more than one clock period to complete, for example. Such an arrangement also allows execution of instructions in the different execution units to be overlapped. The consequence is that the results of the execution of the instructions of a given program by the execution units are not produced in program order. Each instruction code is always executed in the order it is received from the central pipeline unit 12. The system architecture of processor 10; i.e., having several execution units, requires that several copies of the major registers, for example the A and the Q, be kept. As processing proceeds, the valid copy of a particular register may be in any one of the execution units or in any of several different register banks within processor 10. Central pipeline unit structure 12 maintains a record of the currently valid copy for each register and recognizes when the execution of the next instruction requires transferring a copy of the contents of a register from one execution unit to another. However, maintaining a valid copy of the contents of a particular register is complicated by the length of pipeline 12, which is five instructions or clock periods deep. The ability to determine the contents of each addressable register immediately prior to the occurrence of a fault is a requirement for prompt recovery from a fault.

In any pipeline computer, processing of any one instruction is overlapped with the processing of several other instructions in different stages of execution. In addition, in CPU 10 several instructions may simultaneously be executed in different execution units. As a result, at any one time, the registers of pipeline 12 and of execution units 26, 28, 30, 32 could contain register changes resulting from the processing and, execution of several different instruction codes. When an instruction program fault, instruction processing error, or an interrupt occurs, collector 36 must be halted at the end of the last successfully completed instruction. All register changes as a result of the execution in program order of instructions prior to the fault, error, or interrupt should be completed and any program visible register change or changes to memory as a result of execution of later in program order instructions must be cancelled or deleted. Collector 36 provides a valid, current copy of each of the program addressable registers to facilitate fault and error recovery and for handling interrupts. A record of the proper program order for all instructions in execution being processed by CPU 10 is maintained in instruction execution queue 34. Instruction execution queue 34 contains one entry for every instruction in process. Entries into the master safe store 54 and into store stack 56 are ordered so that they are unloaded in proper program order; i.e., the same order or sequence in which the instructions are stored into the instruction execution stack 34 by the central pipeline unit's distributor 24. The instruction execution queue words contain the operation code of the instruction and identify by means of a table lookup technique the execution results stack in which the result of that instruction when executed is, or will be, entered. The result of each instruction executed is then transferred from the appropriate results stack to master safe store 54 or to store stack 56 in program order. Thus, in collector 36, instructions are completed and the results of each are received and arranged in the proper or program order. Collector 36 also performs the actual execution of all memory store instructions. Master safe store 54 contains a copy of all program visible registers so that it is a convenient place to obtain the contents of program visible registers which are to be written into memory. Handling store instructions in collector 36 with the data to be written into memory 22 coming from either master safe store 48 or the execution units' results stacks via store stack 56 maintains program order and avoids the necessity for the execution units 44 through 50 from being involved in store instructions. Thus, in this sense, collector 36 is another execution unit for processing store instructions. As a result, simple stores can be overlapped with the execution of other instructions taking two or more clock periods. The information stored in the master safe store 48 makes it relatively easy for the central processor unit 10 to retry hardware instructions where deemed necessary.

What is claimed is:

1. A synchronous central processor for a general purpose digital data processing system, said central processor being synchronized by clock pulses produced by clock means and having a given repertoire of instructions, said processor comprising:

cache means adapted to store machine words, said machine words including instructions and operands;

a plurality of instruction execution units, each of which unit executes a different set of the instructions of the repertoire independently of and in parallel with one another, each instruction requiring a predetermined number of clock periods to complete and each execution unit having a results stack into which the result of the execution of each instruction is stored;

instruction fetch means for fetching instructions from the cache means and for queuing instructions awaiting execution;

central unit means for obtaining instructions of a given program from the instruction fetch means in program order, for decoding the instructions, for preparing the address of an operand to be operated upon by the instruction, for checking to determine if the addressed operand is stored in the cache means, for accessing the addressed operand from the cache and for dispatching the instruction and its operand to the one of said plurality of instruction execution units for executing it, each of said instruction execution units executing the instructions dispatched to it in the order received to produce a result and storing the result of the execution of each instruction in its results stack in the order of execution, the number of clock periods required to execute each instruction differing so that the results of the execution of instructions of a given program by the instruction execution units are not produced in program order; and collector means for obtaining in program order the results of the execution of the instructions of the program from the results stacks of the instruction execution units and for writing into the cache means the results of the execution of instructions of the program which are to be written into memory in program order.

2. The synchronous central processor of claim 1 in which the set of instructions executed by a first instruction execution unit is limited to instructions that require only one clock period to execute.

3. The synchronous central processor of claim 2 in which sets of instructions executed by instruction execution units other than the first are not limited as to the number of clock periods within which each instruction is to be executed.

4. The synchronous central processor of claim 3 in which all execution units other than said first execution unit includes an input stack into which are stored operation codes and their associated operands dispatched to said other execution units by the central unit for execution.

5. The synchronous central processor of claim 4 in which the input stacks and results stacks are first in first out stacks.

6. A synchronous central processor for a general purpose digital data processing system, said system having memory means for storing meachine words, said machine words including instructions and operands, said central processor being synchronized by clock pulses produced by clock means and having a given repertoire of instructions, said processor comprising:

a plurality of instruction execution unit means, each of which execution unit means executes a different set of the instructions of the repertoire of the processor independently of and in parallel with the other execution unit means, each instruction requiring an integral number of clock periods to complete, and each execution unit means having results stack means into which the result of the execution of each instruction is stored;

instruction fetch means for fetching instructions from the memory means;

central unit means for obtaining instructions of a program from the instruction fetch means in program order, for decoding the instructions, for preparing the address of operands to be operated upon by the instructions, for obtaining the addressed operands from the memory means and for dispatching in program order each instruction and its operand to the one of said plurality of execution unit means for executing it, each of said execution unit means executing the instructions dispatched to it in the order received to produce a result and storing the result of the execution of each instruction in its results stack means in the order of execution, the number of clock periods required to execute each instruction differing so that the results of the execution of instructions by the instruction execution unit means are not produced in program order; and collector means for obtaining from the results stack means of the execution unit means in program order the results of the execution of instructions of said program by the instruction execution unit means and for writing into the memory means the results of the execution of instructions which are to be written into the memory means in program order.

* * * * *